(12) United States Patent
Priestley et al.

(10) Patent No.: US 7,571,467 B1
(45) Date of Patent: Aug. 4, 2009

(54) SYSTEM AND METHOD TO PACKAGE SECURITY CREDENTIALS FOR LATER USE

(75) Inventors: Matthew Charles Priestley, Bellevue, WA (US); Daniel Doubrovkine, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 847 days.

(21) Appl. No.: 10/083,010

(22) Filed: Feb. 26, 2002

(51) Int. Cl.
  *G06F 7/04* (2006.01)
(52) U.S. Cl. .................. 726/6; 726/1; 726/2; 726/5; 726/14; 726/27; 713/182; 380/277; 709/200; 705/18
(58) Field of Classification Search ............ 713/169, 713/193, 194, 200, 201, 202, 165, 171, 183, 713/155, 156, 182, 185, 179; 380/30, 255, 380/277, 281; 726/5, 6, 10, 18, 8, 9, 14, 726/26, 27, 1, 2; 709/200; 705/18
See application file for complete search history.

(56) References Cited

U.S. PATENT DOCUMENTS

| | | | | |
|---|---|---|---|---|
| 5,222,135 A * | 6/1993 | Hardy et al. | ................. | 713/183 |
| 5,497,421 A * | 3/1996 | Kaufman et al. | ............ | 713/156 |
| 5,604,490 A | 2/1997 | Blakley, III et al. | ..... | 340/825.31 |
| 5,757,920 A * | 5/1998 | Misra et al. | ................ | 713/158 |
| 5,764,887 A | 6/1998 | Kells et al. | ................... | 395/186 |
| 5,802,276 A | 9/1998 | Benantar et al. | ............ | 395/186 |
| 5,825,300 A * | 10/1998 | Bathrick et al. | ............ | 340/5.74 |
| 5,875,296 A | 2/1999 | Shi et al. | ................ | 395/188.01 |
| 5,995,625 A * | 11/1999 | Sudia et al. | .................... | 705/51 |
| 5,999,711 A | 12/1999 | Misra et al. | ............ | 395/187.01 |
| 6,052,785 A | 4/2000 | Lin et al. | .................... | 713/201 |
| 6,343,361 B1 * | 1/2002 | Nendell et al. | .............. | 713/171 |
| 6,349,338 B1 | 2/2002 | Seamons et al. | ............ | 709/229 |
| 6,377,994 B1 | 4/2002 | Ault et al. | ................... | 709/229 |
| 6,401,211 B1 | 6/2002 | Brezak, Jr. et al. | .......... | 713/201 |
| 6,607,136 B1 * | 8/2003 | Atsmon et al. | .............. | 235/492 |
| 6,920,567 B1 * | 7/2005 | Doherty et al. | ............... | 726/22 |
| 6,986,050 B2 * | 1/2006 | Hypponen | ................. | 713/183 |
| 6,993,555 B2 * | 1/2006 | Kay et al. | ................... | 709/202 |

(Continued)

OTHER PUBLICATIONS

Sung-Min Lee et al, A Secure Electronic Software Distribution (ESD) Protocol Based on PKC, Springer-Verlag Berlin Heidelberg, 2000.*

(Continued)

*Primary Examiner*—Nasser G Moazzami
*Assistant Examiner*—Shanto M Abedin
(74) *Attorney, Agent, or Firm*—Shook, Hardy & Bacon L.L.P.

(57) ABSTRACT

The present invention relates to a system and methodology to facilitate communications security in a distributed computing and applications environment. A pass-phrase is generated to wrap a strong set of security credentials that are employed to establish trusted relationships between entities such as a service provider and one or more partners seeking access to the provider. The pass-phrase is generally constructed from weaker cryptographic material and is generally transported or communicated separately from the wrapped security credentials. When the partner desires to access service resources, the pass-phrase is employed to unlock the strong set of security credentials contained within the wrapper. The unlocked security credentials are then utilized to establish encrypted communications channels between the service provider and the partner.

19 Claims, 8 Drawing Sheets

U.S. PATENT DOCUMENTS

| | | | | |
|---|---|---|---|---|
| 7,111,172 | B1* | 9/2006 | Duane et al. | 713/182 |
| 7,114,080 | B2* | 9/2006 | Rahman et al. | 713/186 |
| 7,210,167 | B2* | 4/2007 | Brezak et al. | 726/18 |
| 7,210,169 | B2* | 4/2007 | Smith et al. | 726/28 |
| 2001/0011254 | A1* | 8/2001 | Clark | 705/59 |
| 2001/0014158 | A1* | 8/2001 | Baltzley | 380/281 |
| 2002/0007453 | A1* | 1/2002 | Nemovicher | 713/155 |
| 2002/0031230 | A1* | 3/2002 | Sweet et al. | 380/278 |
| 2002/0059144 | A1* | 5/2002 | Meffert et al. | 705/51 |
| 2002/0104019 | A1* | 8/2002 | Chatani et al. | 713/201 |
| 2002/0178353 | A1* | 11/2002 | Graham | 713/151 |
| 2003/0060188 | A1* | 3/2003 | Gidron et al. | 455/408 |
| 2003/0097579 | A1* | 5/2003 | England et al. | 713/193 |
| 2003/0142364 | A1* | 7/2003 | Goldstone | 358/402 |
| 2003/0188183 | A1* | 10/2003 | Lee et al. | 713/200 |

OTHER PUBLICATIONS

Sub Ramakrishnan, Java Based E-Commerce Middleware, 0-7695-0990-8/01/$10.00, IEEE, 2001.*

Stuart Jacobs, Tactical Network Security, 0-7803-5538-5/$10.00, IEEE, 1999.*

Bruce Schneier, Applied Cryptography, Second Edition, Wiley, 1996.*

"A secure Electronic Software Distribution (ESD) Protocol Based on PKC", Sung-Min Lee et al, Springer, 2000.*

"Tactical Network Security", Stuart Jacobs, IEEE, 1999.*

"Applied Cryptography", Bruce Schneier, pp. 174, Second edition, Wiley, 1996.*

Sung-Min Lee et al, A secure electronic software distribution (ESD) protocol based on PKC, Springer 2000.*

Brainard, SecurSight: An architecture for secure information access, RSA Laboratories.*

Stuart, Tactical network security, IEEE, 1999.*

Schneier, Applied Cryptography, Wiley, 1996.*

Kyung-Ah Chang, et al. "CORBA-based Fair Contracts Support System for Subjects of Electronic Commerce" *IEEE International Workshops on Parallel Processing Proceedings*, 1999, p. 1-6.

Michael Hitchens, et al. "Design Choices for Symmetric Key Based Inter-Domain Authentication Protocols in Distributed Systems" Proceedings of the 12th Annual Computer Security Applications Conference (ACSA), 1996, p. 105-116.

Peter Sewell, et al. "Secure Composition of Untrusted Code: Wrappers and Causality Types" IEEE, 2000, p. 1-16.

John G. Brainard, "SecurSight: An Architecture for Secure Information Access", RSA Laboratories, p. 1-9.

Neil Ching, et al. "Authorization in the Digital Library: Secure Access to Services Across Enterprise Boundaries" IEEE Proceedings of ADL 1996, p. 110-119.

* cited by examiner

SYSTEM AND METHOD TO PACKAGE SECURITY CREDENTIALS FOR LATER USE

TECHNICAL FIELD

The present invention relates generally to computer systems, and more particularly to a system and method to package, deliver, negotiate and deploy security credentials between remote network entities.

BACKGROUND OF THE INVENTION

Network technologies such as the Internet have provided users and other entities with virtually unlimited access to remote systems and associated applications. This type of access in many cases has become a complex maze of processes that is often offloaded to third-party systems to manage. Application heterogeneity has increased exponentially, and rapid growth has forced enterprises to develop and deploy applications ever faster, even at the expense of integration and ease of administration. Historically, enterprises generally only had to consider these issues at an internal level. In many situations however, these enterprises now have to grant external access to employees, supply chain partners, contractors and customers. Organizations that employ third-party service providers (application, network or otherwise) generally, must manage users and access rights across both their internal systems and the systems run by service providers.

Provisioning systems automate the task of establishing new users' rights and privileges across multiple applications. For example, these systems can augment existing security practices by enabling administrators to quickly cut off terminated employees, and when necessary standards evolve, provisioning systems can automate changes in employment status and responsibility across business partner networks. Other types of provisioning systems can be designed to manage financial interactions between parties as another example.

Most provisioning systems include a rules engine and workflow system; a logging and audit system; a database to support the workflow and auditing tasks; and agents that communicate with applications to add, delete, suspend or change users and privileges. Not all provisioning systems have equal spans of control, however. Most enable database and application access, but vendors often need to increase their support for provisioning devices, access to buildings and service subscriptions, as well as automate the ordering of equipment and other supplies. Given the divergent requirements to design and support such systems and often across great distances, networks and geographical boundaries, network security has become a major concern and consideration when attempting to implement and service an effective provisioning system.

An aspect of network security that is generally required by provisioning and other systems involves establishing a secure and encrypted channel of communications between remote parties and to properly authenticate the parties (machines and humans) that may attempt to communicate over such channels. One such aspect involves a master entity that produces a set of security credentials for a remote entity and then attempts to deliver those credentials to the remote entity in order to establish secure communications. These types of transactions often expose the security credentials to other people or systems having access to the provisioning process and/or are peripherally involved in the process. As can be appreciated, security can be compromised if other parties or entities can access or become aware of security information involving other parties to a transaction. For example, there generally is no need for anyone working with or processing security credentials to be aware of the underlying nature or value of the credentials. Thus, lower security-level staff members should be able to handle these credentials without significant risk of a security breach. Another problem with many conventional security techniques is that the security credentials often are not kept persistent (remain the same across conversations). This also can affect the ability of services to support multiple entities across a plurality of communications channels.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to facilitate secure network communications between remote network entities or parities to a transaction. This is achieved by providing a strong set of security credentials between a master entity such as a service and a remote entity such as a partner when performing network communications, wherein the partner generally attempts to access one or more resources provided or offered by the service. In conjunction with the strong set of security credentials, a protocol is provided that mitigates exposure of the contents, relevance or value of the security credentials to other parties that are not privy to the communications between the service and the partner. In other words, the protocol provides a package, wrapper or container to house the security credentials before delivery from the service to the partner to facilitate secure communications between the parties.

The package can be employed to encapsulate or insulate the security credentials in order to mitigate exposure of the credentials to non-trusted parties who may also happen to come in contact with the package. By packaging the security credentials in this manner, many advantages are provided in accordance with the present invention. For example, non-related parties to a transaction working with the packaged credentials are generally kept unaware of the package's inner contents that are employed to facilitate a security channel between interested parties. The protocol also facilitates handling of the package by lower-privileged or lower-security staff members without significant risk of exposure of the security credentials to these members. The security credentials can also provide persistence and enable services to support multiple partners by holding or storing multiple sets of credentials.

According to one aspect of the present invention, an authentication or credential negotiation system is provided that can be employed in conjunction or as part of a provisioning system (e.g., a provisioning system that provides billing services between service providers and end users). The system includes a service that issues a strong set of credentials (e.g., greater than 100 bit random password) to one or more partners desiring access to resources of the service. A pass-phrase is generated and employed by the service to produce a cryptographic wrapper or wrapping key to provide or mediate access to the credentials. Thus, entities that posses the pass-phrase can achieve access to the security credentials via the pass-phrase, whereas other entities that merely process or have access to the wrapper are kept substantially unaware of the security contents contained therein.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology to facilitate transport and deployment of security credentials in a distributed computing and applications environment. A pass-phrase is generated to wrap or shield a strong set of security credentials that are employed to establish trusted relationships between entities such as a service provider and one or more partners seeking access to the provider. The pass-phrase is generally constructed from weaker (e.g., less random data) cryptographic material and is generally transported or communicated separately from the wrapped security credentials. When the partner desires to access service resources, the pass-phrase is employed to unlock or unwrap the strong set of security credentials contained within the wrapper. The unlocked or unwrapped security credentials are then utilized to establish encrypted communications channels between the service provider and the partner.

The encryption and security architecture of the present invention promotes many beneficial aspects between service providers and partners. One such aspect is related to service controls in that services can terminate resource access substantially at any time. Another aspect is related to partner controls, wherein the partner can set up as many authorized servers as desired to communicate to the service via the security credentials. This can include administrative benefits such as adding or replacing other servers without requesting permission from the service. Servers in the partner network that do not have the package or wrapped credentials installed are thus not authorized to communicate to the service.

Moreover, credentials can be transmitted from the service to the partner while mitigating exposure from attacks. Thus, humans working for services or partners generally do not need to know the inherent value of the security credentials. In addition, the pass-phrase can be human-readable without requiring the security credentials to be simplistic in nature. Consequently, an attacker generally must have both the wrapped package and the pass-phrase before achieving access to the security credentials. In addition, the security aspects and architecture of the present invention provide an effective process for sharing many-to-many secrets at a substantially low cost.

Figure 1:
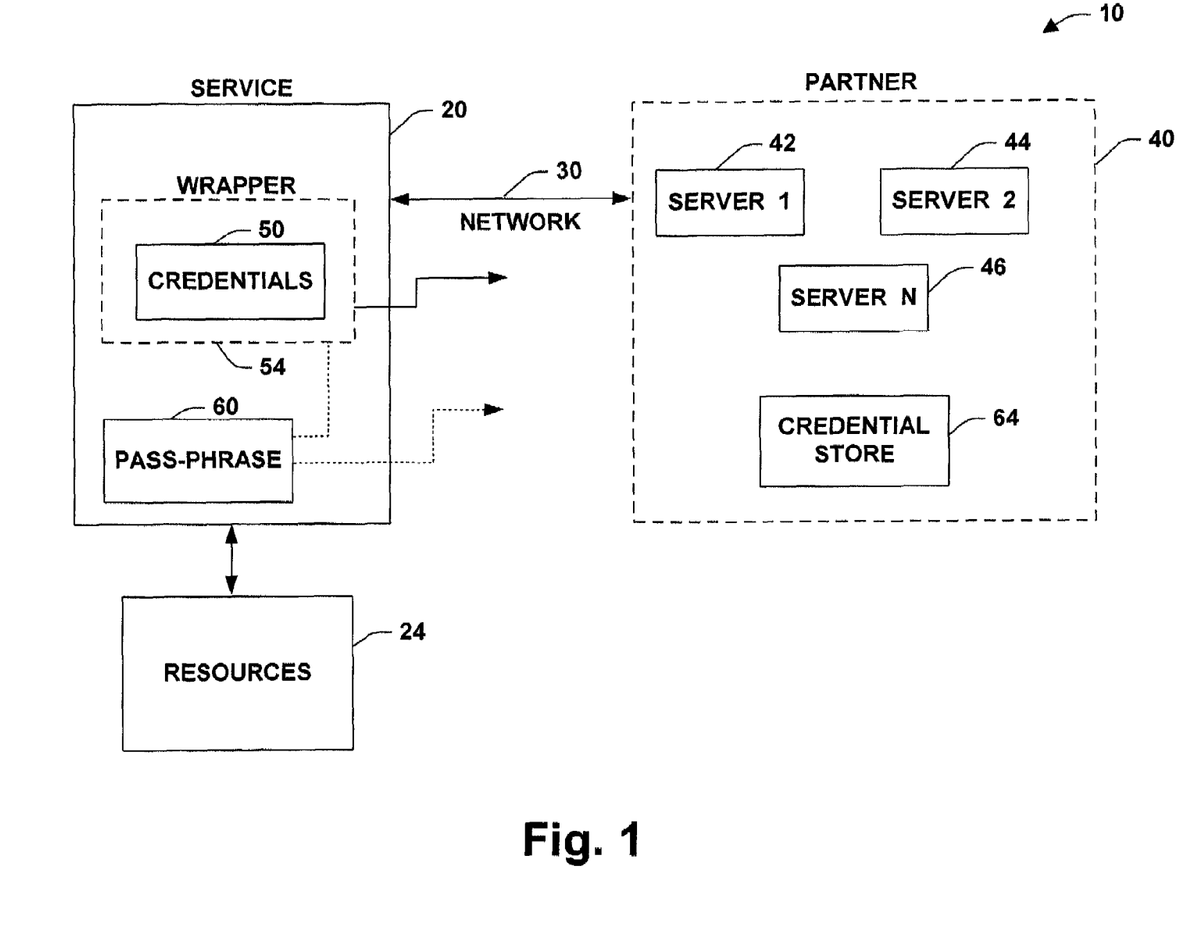
FIG. 1 is a schematic block diagram illustrating a security architecture in a distributed computing environment in accordance with an aspect of the present invention.

Referring initially to FIG. 1, a system 10 illustrates a security architecture in a distributed computing environment in accordance with an aspect of the present invention. A service 20 maintains a plurality of resources 24 and facilitates access to valid parties. The service 20 can be substantially any application or system that provides remote access to the resources 24 via a network 30. A partner 40 attempts to access the resources 24 of the service 20 across the network 30. It is to be appreciated that a plurality of such partners 40 and services 20 can interact on the network 30 and can be configured as part of a distributed application, component or machine in accordance with the present invention. One or more servers 42 through 46 are associated with the partner 40 and can be authorized by the partner to communicate with the service 20.

A set of credentials 50 are generated and employed by the service 20 as proof that the holder should be granted access to the resources 24. The service 20 can include a wrapping installer (not shown) that packages the credentials 50 within a wrapper or package 54, wherein the package can be duplicated and distributed if desired (e.g., via storage medium such as CD-ROM, across network). A human-readable or other type pass-phrase 60 is generated by the service 20 that mediates access to the credentials 50, wherein a cryptographic wrapping key is derived from the pass-phrase and employed to generate the wrapper 54. A substantially secure credential store 64 associated with one or more of the partner servers 42-46 can also be utilized to hold and retrieve the credentials.

Generally, the service 20 defines what constitutes a credential 50 and can differ from service to service. As one possible example, standard personal computer operating system credentials can be employed. An advantage of utilizing standard type credentials is an ability to recognize passwords at a later time—generally without requiring an actual storage of the password. Alternatively, these credentials can be substantially any cryptographic technique the service 20 decides to honor. In addition, the credentials 50 can be employed as a straightforward password to provide partner access to the resources 24. Initially, the partner 40 requests to be issued the wrapper or package 54 and pass-phrase 60 in order to gain access to the resources 24. The service 20 then generates unique credentials 50 for respective new partners 40. This can include generating a new partner account and setting a new password against it. It is noted that the credential password is employed as the keying material to facilitate encrypted communications between the service 20 and the partner 40, whereas the pass-phrase 60 discussed above is employed to gain access to the credentials 50.

In general, it is desirable for the credentials 50 to be strong to facilitate substantially secure communications between parties. In this case, the credentials 50 can include a username that is human readable, but provide a strong password for employment of the credentials 50 (e.g., credential password of 168 bits of randomness generated from a standard platform CryptGenRandom function). The resulting credentials 50 are generally too strong to be read and accessed by humans conveniently, however, computers can access these credentials efficiently. Even though there generally is one set of credentials 50 per partner 40, more than one server 42-46 associated with respective partners may utilize and/or share the credentials.

After generating the credentials 50, the service 20 generates the pass-phrase 60. One characteristic of the pass-phrase 60 can be one of providing human-readability. For example, this can include a substantially random string of upper-case or other style letters and numbers. In general, the pass-phrase 60 is not as strong as the credentials 50 in most cases since there does not have to be as much entropy (e.g., pass-phase has fewer bits of random data). For example, an exemplary pass-phrase could be generated as {DBAB-6FFE-82B2-4D65-819E-32DD-4D90-4C51} or other alphanumeric string. It is noted that the pass-phrase 60 can be spoken, displayed on a screen, and/or can be type-able.

The pass-phrase 60 is employed to generate a cryptographic wrapping key (e.g., standard API CryptDeriveKey function). With a given pass-phrase 60, for example, the resulting wrapping key is generally the same. The wrapping key is then employed to cryptographically wrap or insulate the credentials 50 in the wrapper or package 54 (e.g., standard API CryptExportKey function). It is noted after the set of credentials 50 have been placed into the wrapper 54, that generally only an entity that has the pass-phrase 60 can retrieve the credentials. The wrapped package 54 can be inserted into subsequent package or application for distribution. For example, the package 54 can be included as part of an installer file or application. The package 54 can be substantially any vehicle capable of storing the wrapped credentials 50 and capable of manipulating the wrapped credentials at a later time.

After wrapping the credential 50, the service 20 delivers the package 54 and the pass-phrase 60 in separate communications to the partner 40. For security reasons, the pass-phase 60 and package 54 generally should be delivered separately. For example, if these items were ever isolated together, then there would be substantially diminished security value since any entity could utilize the pass-phrase 60 to unlock the package 54. One possible manner to transport these items separately is to send the package 54 via CD, e-mail, or signal composed of data packets but communicate the pass-phrase 60 over the phone, other medium or subsequent and unrelated signal over the network or other medium.

The partner 40 can install the package 54 on servers 42 through 46 that are determined to have the ability or need to communicate with the service 20. Substantially wherever the package 54 is executed, the associated partner server can receive the credentials 50 and the ability to authenticate to the service 20. The package 54, when executed, generally requires the partner 40 to supply the pass-phrase 60. The pass-phrase 60 is then employed to derive the wrapping key, wherein the wrapping key is utilized to unwrap the credentials 50. The credentials 50 are then inserted into the credential store 64 can act as a Local Security Authority. If the pass-phrase 60 provided is invalid, the unwrapping operation would then fail since the wrong key would be derived. In that case the credentials 50 remain wrapped.

It is noted that the partner 40 and service 20 employment of the credentials 50 can be implementation-specific. For example, the implementation can differ based upon business needs or other considerations. The credentials can be employed to perform a remote logon using a Basic Authentication over a Secure Socket Layer (SSL) connection, for example. If there is need to disable a partner 40, the service 20 can change the status of the credentials 50 internally. This can include changing an associated user's password or disabling the user's account which would subsequently terminate access to the service 20 by the partner servers 42-46 that attempt to access the now-invalid credentials 50.

Figure 2:
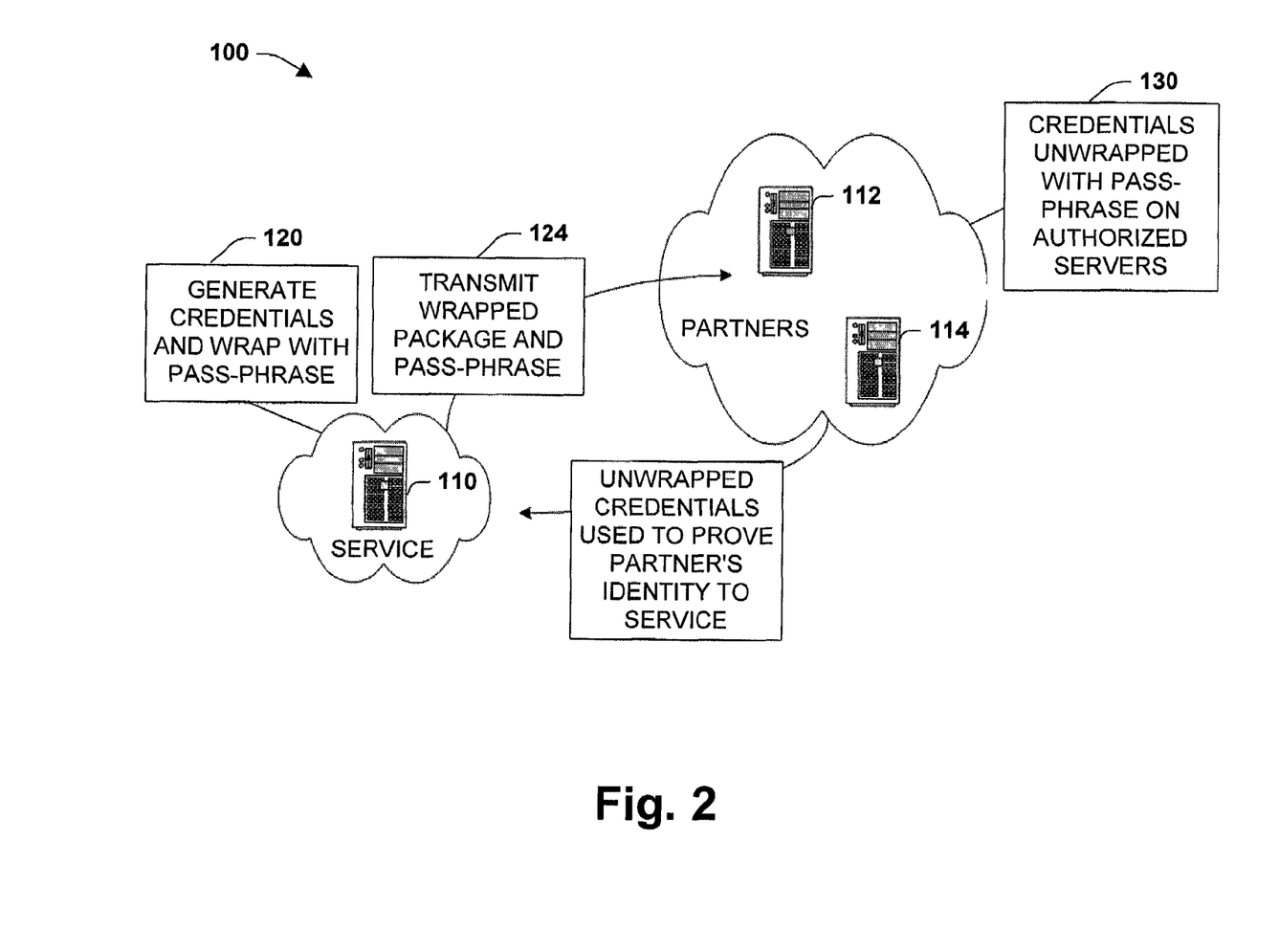
FIG. 2 is a diagram illustrating credential and pass-phrase management in accordance with an aspect of the present invention.

Referring now to FIG. 2, a system 100 illustrates temporal aspects of credential and pass-phrase management in accordance with an aspect of the present invention. The system 100 includes a service machine or service 110 operative with one or more partner servers or partners 112 and 114. Initially, at 120, the service 110 generates credentials to be employed in establishing a potential, future trust relationship. The credentials are also wrapped with a pass-phrase by the service 110. At 124, the credentials that were wrapped at 120 are transmitted to the partners. In addition, the pass-phrase is also transmitted or communicated to the partners. As noted above, the pass-phrase should be transmitted and/or transported separately from the package to mitigate the possibility of an un-trusted party being to access the credentials. At 130, the wrapped credentials are unwrapped or unlocked by one or both partners 112 and 114 via that pass-phrase. At 144, the unwrapped credentials are provided to the service 110 prove the partner server's 112 and/or 114 identity to the service 110 in order to establish a trust relationship between the parties. It is noted that for security purposes, the partners 112 and 114 or other partners (not shown) should be issued a different set of credentials to achieve resource access. Thus, for maximum security, respective partners receive a different set of credentials, a different wrapped package, and a different wrapping pass-phrase.

Figure 3:
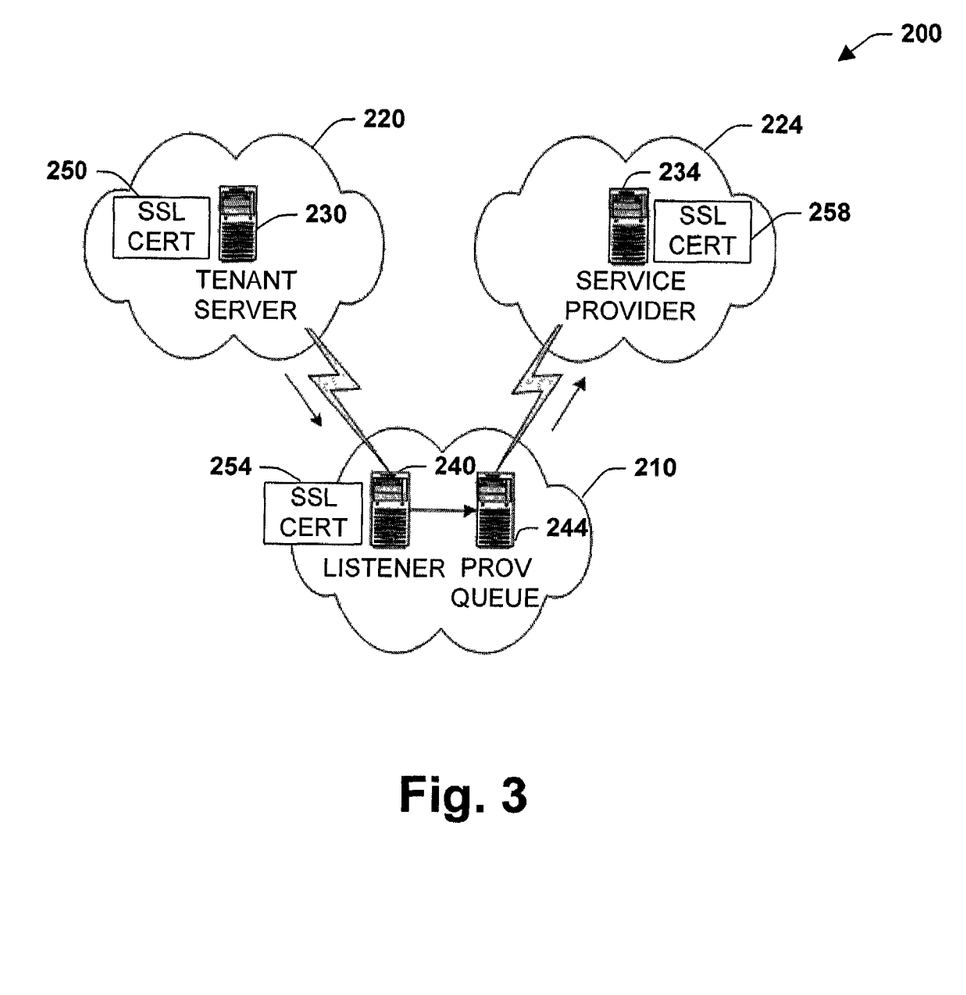
FIG. 3 is a diagram illustrating an exemplary partner and service security exchange in a provisioning system context in accordance with an aspect of the present invention.

Turning now to FIG. 3, a system 200 illustrates an exemplary partner and service security exchange in a provisioning system context in accordance with an aspect of the present invention. The system 200 illustrates one particular example of the security aspects of the present invention being employed in a provisioning system. The system 200 also illustrates some generic provisioning relationships with a partner. For example, a partner 220 and/or 224 can be in the same network as provisioning platform service 210 that can be configured to offer billing and promote relationships between tenants 230 and service providers 234. The platform service 210 can also communicate with the partners 220 and/or 224 over the Internet or other remote network. It is to be appreciated that a plurality of such tenants 230 and service providers 234 can communicate with the platform service 210. It is noted that tenants 230 can be configured as partners that call the platform service 210, whereas the service providers 234 can be configured as partners that are called by the platform service 210 for provisioning events such as setting up and managing electronic accounts and performing electronic billing and/or other financial/accounting operations. It is also noted that a given partner can be both a tenant and a service provider.

As illustrated, the platform service 210 can include a listener 240 to interface with the tenant 230 and a provisioning queue 244 to interface with the service provider 234. A Secure Socket Layer (SSL) certificate 250, 254, and 258 can be exchanged to establish trust relationships in accordance with the present invention. The SSL certificates 250-254 can be exchanged after the unwrapping or unlocking procedure that has been previously described. The platform service 210 can expose platform interfaces to other services in addition to end customers. As a result, it is not always necessary for the services to converse over a network such as the Internet and can reside in the same data center, for example. It is noted that although an SSL connection is described to facilitate transmission security between partners and services, other techniques such as a Virtual Private Network (VPN) or a dedicated line can be employed to facilitate such security.

Figure 4:
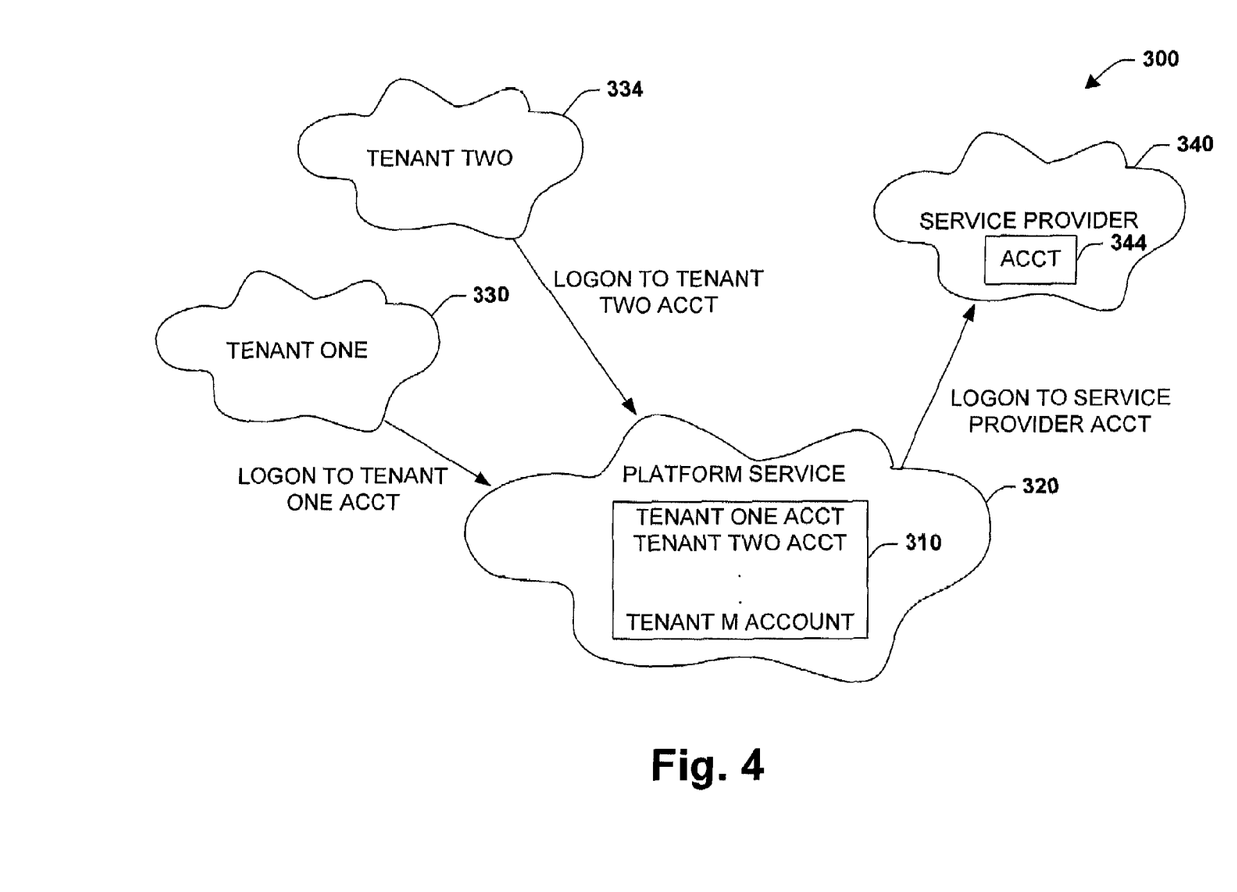
FIG. 4 is a diagram illustrating security account management in accordance with an aspect of the present invention.

Referring now to FIG. 4, a system 300 illustrates security account management in accordance with an aspect of the present invention. A secure channel between parties establishes privacy, data integrity, and authentication of network endpoints. Requests for an SSL connections from partner to service or visa versa can be accompanied by a basic authentication header (not shown). The header can contain credentials from an account 310 that exists on a platform service 320, wherein the account 310 can include 1 to M individual accounts, M being an integer. For example, when a partner such as a tenant 330 or 334 desires to contact the platform service 320, the partner can connect via SSL to a platform service Universal Resource Locator (URL) and present credentials for an account 310. When the platform service 320 desires to contact a service provider 340 for provisioning, as an example, the platform service also can connect via SSL to the service provider's URL and present credentials for an account 344 in the service provider's system. The credentials provided by the platform service 320 are employed to secure access to interface components (e.g., Simple Object Access Protocol (SOAP)).

Generally, only authenticated partners can access the platform services 320. On the service provider 340 side, generally only authenticated platform services 320 can issue provisioning calls. Thus, regardless of where the credentials reside, the platform services and the associated partners are to be aware of the credentials value before utilizing the credentials. This can also require some negotiation between the platform services and the associated partners.

Figure 5:
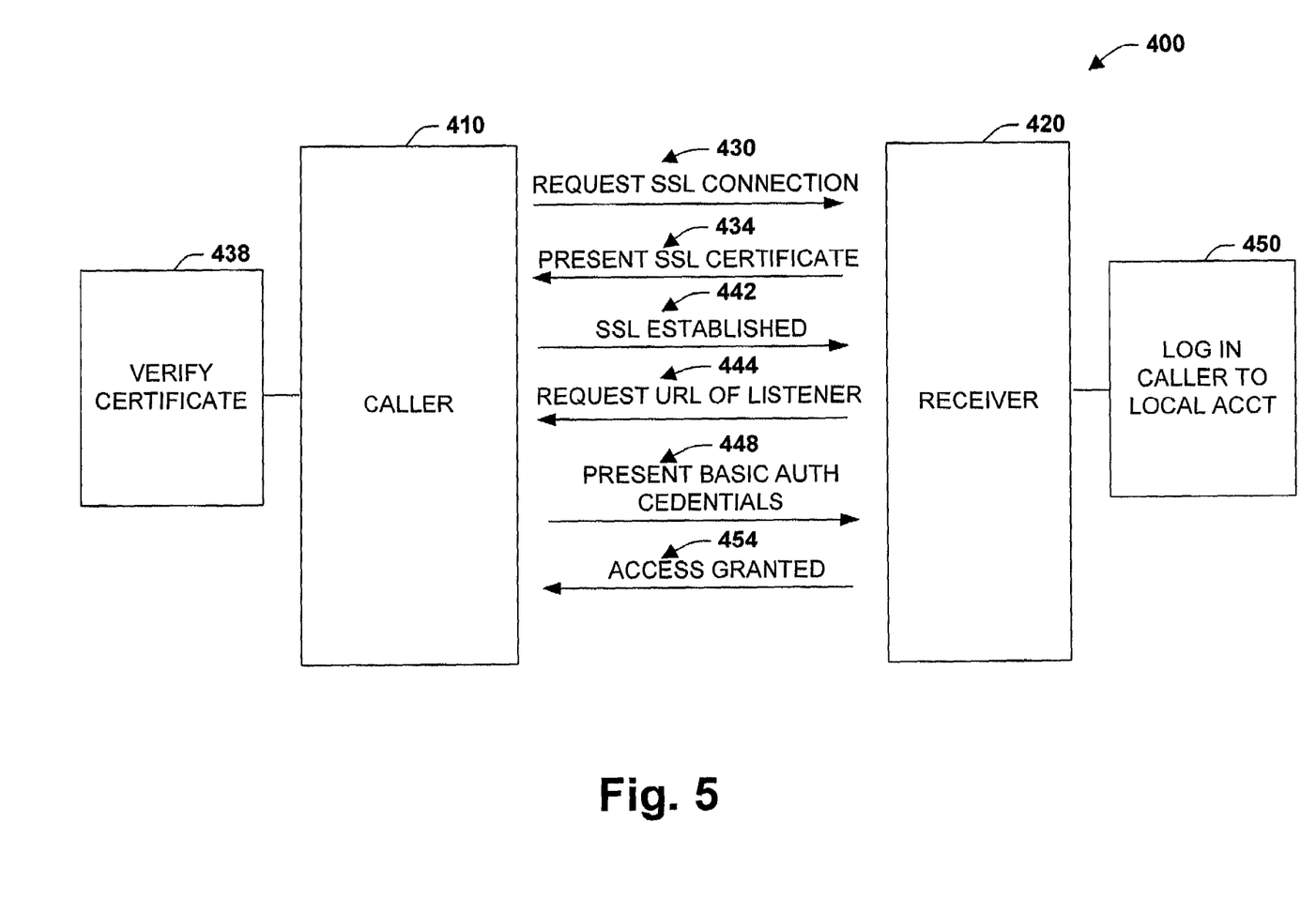
FIG. 5 is a diagram illustrating establishment of a trust relationship in accordance with an aspect of the present invention.

FIG. 5 is a diagram 400 illustrating establishment of a trust relationship in accordance with an aspect of the present invention. For the purposes of the following discussion, a Caller 410 can be a service that desires to communicate to another service and a Receiver 420 can be a service to which the Caller makes requests. For example, the platform service described above can be a Caller 410 when it makes a provisioning request to a service provider receiver 420. In a similar manner, a tenant can be a Caller 410 when it makes a call to the platform services acting as a Receiver 420. When the Caller 410 connects to a service of the Receiver 420, the following transactions can occur.

At 430, the Caller 410 requests an SSL connection to the Receiver's well-known domain address. At 434, the Receiver 420 presents an SSL certificate in response to the request. At 438, the Caller 410 verifies the Receiver's SSL certificate and negotiates an SSL session. This provides authentication of the Receiver 420 to the Caller and an SSL connection is established at 442. At 444, the Caller 410 requests the URL of the Receiver's listener. At 448, the Caller also provides its credentials as an "Authentication: Basic" header under cover of the SSL session established at 442. This can include the Caller's account name and password. At 450, the Receiver 420 logs in the Caller 410 to a local account and allows access to one or more resources. At 454, access is then granted to the resources at the Receiver 420. Substantially all future requests from the Caller will then generally carry the same Basic Auth header.

By virtue of the logon performed at 450, the Receiver 420 can later use the Caller's credentials to secure access to other resources, such as selected APIs or data. This can require that there be a unique account in the platform services for respective tenants, and a single account for the platform services in respective service providers.

Figure 6:
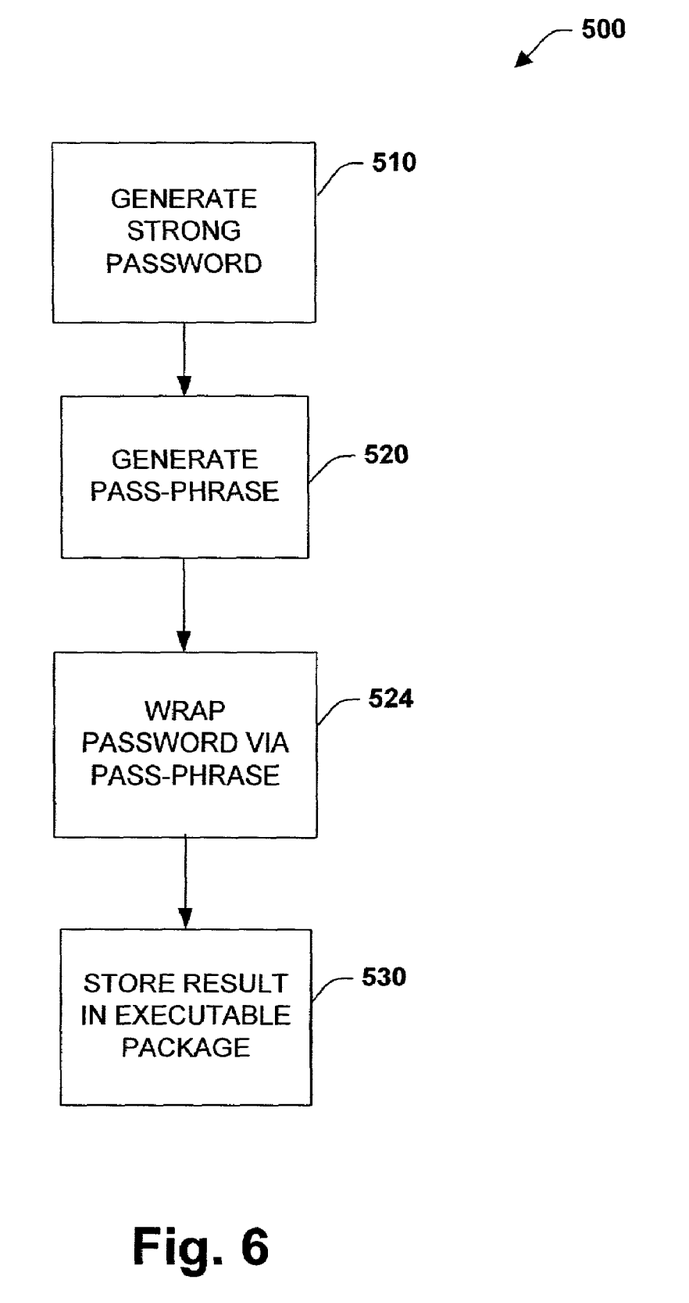
FIG. 6 is a flow diagram illustrating a methodology to facilitate security relationships in accordance with an aspect of the present invention.
Figure 7:
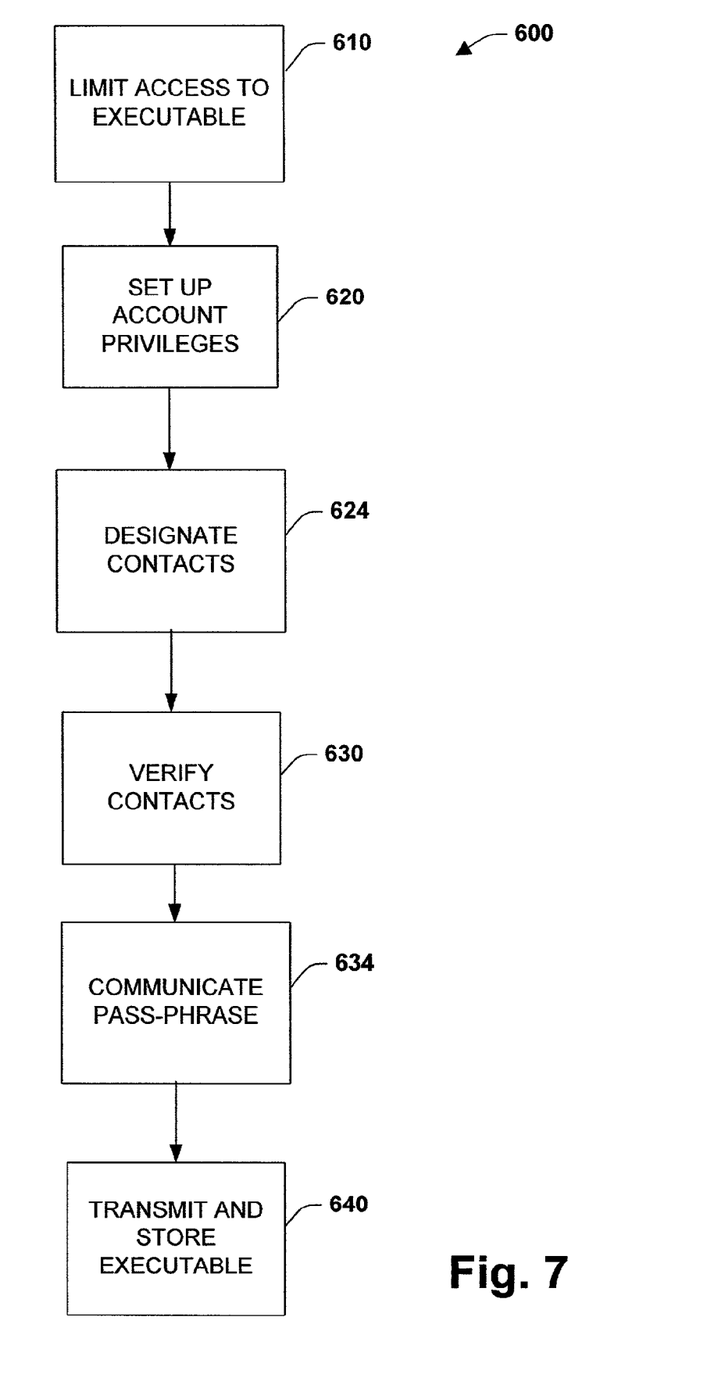
FIG. 7 is a flow diagram illustrating a methodology to manage security relationships in accordance with an aspect of the present invention.

FIGS. 6 and 7 illustrate methodologies to facilitate secure communications channels in accordance with the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

FIG. 6 is a flow diagram illustrating a methodology to facilitate security relationships in accordance with an aspect of the present invention. Credentials generated by platform services should be distributed in an executable, unique for each partner. Depending upon how it is run, the executable should be capable of setting up credentials on either side of the service/partner relationship. Since passwords are stored in the executable file, the partner can set up an arbitrary number of machines without the involvement of platform services and without knowing the security value of the password itself. On the Receiver side, the executable sets the password of the Caller's account to a strong generated value. On the Caller side, the executable stores the credentials in a local storage in order that the Caller can later retrieve and use the credentials. The presence of the strong password in an executable file can pose a security risk. Thus, precautions are taken when generating and storing the password so that the risk is mitigated. The following process depicted in FIG. 6 protects the password by cryptography, whereas the process depicted in FIG. 7 illustrates additional procedural safeguards that can be employed.

At 510, strong password having many bits of entropy is generated. At 520, a random pass-phrase is generated. The pass-phrase can be string of common ASCII characters and random for example, and consists of characters and numbers. For human clarity, the characters 0, o, 1, and l can be omitted. At 524, the pass-phrase is employed to wrap the strong password generated at 510 cryptographically before storing the resulting Binary Large Object (BLOB) in an executable file or package at 530.

FIG. 7 is a flow diagram illustrating a methodology to manage security relationships and provide procedural safeguards in accordance with an aspect of the present invention. At 610, access is limited to the executable file generated at 530 in FIG. 6. Generally, only authorized platform services technicians or administrators and authorized partner personnel should have access to the executable. Partners will thus have access to the executables generated explicitly for them. They should not have access to the executables of other partners.

At 620, account privileges are set up. The executable generally requires account operator privileges (configured in an operating system) in order to run. At 624, respective partners and platform services should designate a contact person who is authorized to request an executable. A list of these contacts and phone numbers should be maintained. At 630, potential requestors are verified. When someone calls with a request, the following can occur: A check that the caller's name is on an authorized list; and a phone hang-up followed with an associated call to the authorized party using the phone number on the list to reduce the likelihood that the caller is a fraud. At this point a deployment tool can be executed to generate a new executable and a new password for the requesting party.

At 634, the wrapping pass-phrase can be communicated to the authorized contact over the phone or other medium. In another transaction, the wrapped executable is transmitted to the authorized contact via e-mail or by handoff of a CD or other storage medium, for example at 640. The executable should be stored by respective parties on a write-protected CD or other storage medium, and the pass-phrase should not be stored on the same storage medium. The pass-phrase can be kept in a paper hardcopy, for example.

Figure 8:
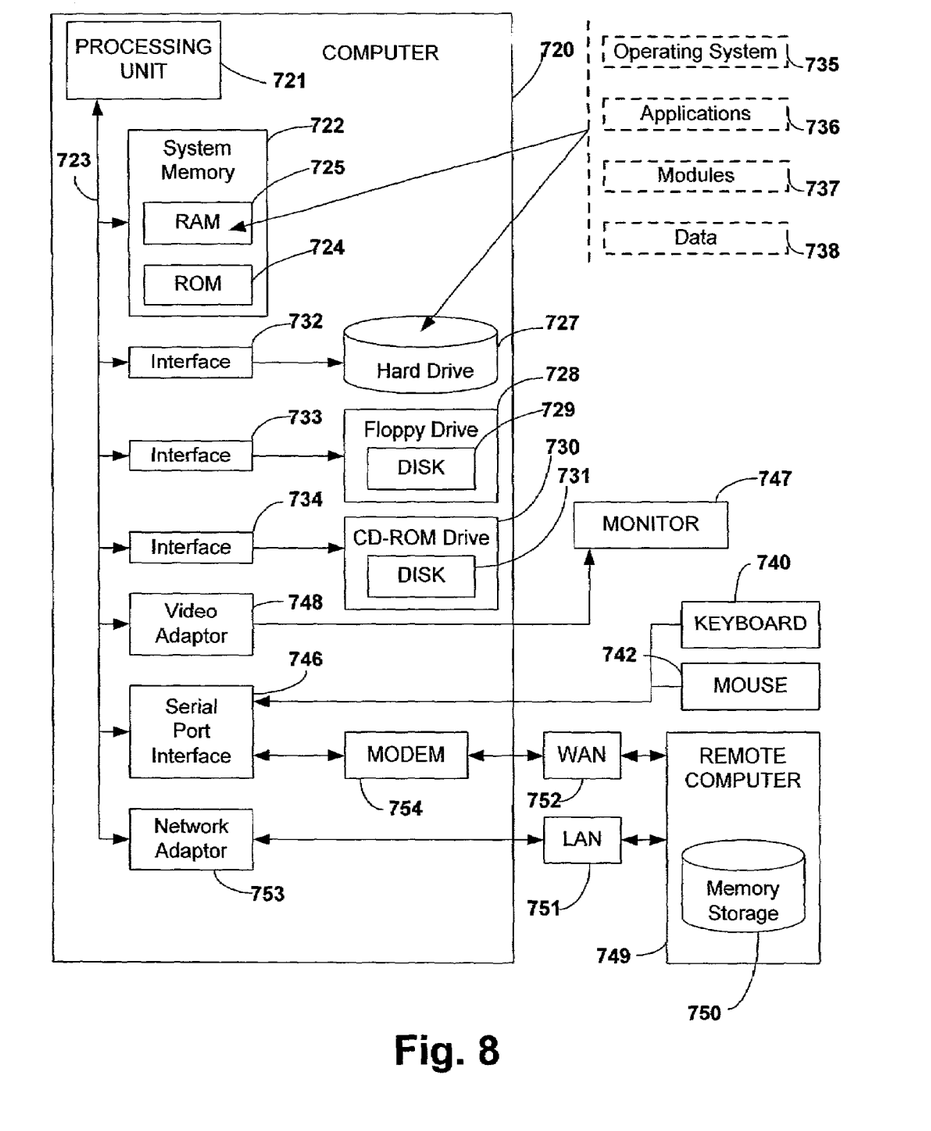
FIG. 8 is a schematic block diagram illustrating a suitable operating environment in accordance with an aspect of the present invention.

In order to provide a context for the various aspects of the invention, FIG. 8 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, handheld computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 8, an exemplary system for implementing the various aspects of the invention includes a computer 720, including a processing unit 721, a system memory 722, and a system bus 723 that couples various system components including the system memory to the processing unit 721. The processing unit 721 may be any of various commercially available processors. It is to be appreciated that dual microprocessors and other multi-processor architectures also may be employed as the processing unit 721.

The system bus may be any of several types of bus structure including a memory bus or memory controller, a peripheral bus, and a local bus using any of a variety of commercially available bus architectures. The system memory may include read only memory (ROM) 724 and random access memory (RAM) 725. A basic input/output system (BIOS), containing the basic routines that help to transfer information between elements within the computer 720, such as during start-up, is stored in ROM 724.

The computer 720 further includes a hard disk drive 727, a magnetic disk drive 728, e.g., to read from or write to a removable disk 729, and an optical disk drive 730, e.g., for reading from or writing to a CD-ROM disk 731 or to read from or write to other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer-readable media provide nonvolatile storage of data, data structures, computer-executable instructions, etc. for the computer 720. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 725, including an operating system 735, one or more application programs 736, other program modules 737, and program data 738. It is noted that the operating system 735 in the illustrated computer may be substantially any suitable operating system.

A user may enter commands and information into the computer 720 through a keyboard 740 and a pointing device, such as a mouse 742. Other input devices (not shown) may include a microphone, a joystick, a game pad, a satellite dish, a scanner, or the like. These and other input devices are often connected to the processing unit 721 through a serial port interface 746 that is coupled to the system bus, but may be connected by other interfaces, such as a parallel port, a game port or a universal serial bus (USB). A monitor 747 or other type of display device is also connected to the system bus 723 via an interface, such as a video adapter 748. In addition to the monitor, computers typically include other peripheral output devices (not shown), such as speakers and printers.

The computer 720 may operate in a networked environment using logical connections to one or more remote computers, such as a remote computer 749. The remote computer 749 may be a workstation, a server computer, a router, a peer device or other common network node, and typically includes many or all of the elements described relative to the computer 720, although only a memory storage device 750 is illustrated in FIG. 8. The logical connections depicted in FIG. 8 may include a local area network (LAN) 751 and a wide area network (WAN) 752. Such networking environments are commonplace in offices, enterprise-wide computer networks, Intranets and the Internet.

When employed in a LAN networking environment, the computer 720 may be connected to the local network 751 through a network interface or adapter 753. When utilized in a WAN networking environment, the computer 720 generally may include a modem 754, and/or is connected to a communications server on the LAN, and/or has other means for establishing communications over the wide area network 752, such as the Internet. The modem 754, which may be internal or external, may be connected to the system bus 723 via the serial port interface 746. In a networked environment, program modules depicted relative to the computer 720, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 720, unless otherwise indicated. Such acts and operations are sometimes referred to as being computer-executed. It will be appreciated that the acts and symbolically represented operations include the manipulation by the processing unit 721 of electrical signals representing data bits which causes a resulting transformation or reduction of the electrical signal representation, and the maintenance of data bits at memory locations in the memory system (including the system memory 722, hard drive 727, floppy disks 729, and CD-ROM 731) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A computer implemented system that facilitates processing credentials between remote entities, comprising:
    a computer memory having stored thereon the following components executable by a processor:
    a wrapper that packages credentials associated with resources of a service, wherein the service is a platform provisioning service associated with at least one partner, the platform provisioning service and the partner maintain an account to process the credentials, the at least one of the platform provisioning service and the partner employ a Universal Resource Locator (URL) to present the credentials to the account; and
    a cryptographic wrapping key generated from a pass-phrase, the cryptographic wrapping key is utilized to generate a the wrapper that encapsulates the credentials, the pass-phrase employed to facilitate access to the credentials, the credentials employed to provide encrypted communication between a remote user and the service that facilitates access to the resources of the service, and the pass-phrase distributed separately from the credentials.

2. The system of claim 1, the credentials providing stronger encryption than the pass-phrase.

3. The system of claim 2, the credentials providing greater than 100 bits of encryption.

4. The system of claim 2, the pass-phase having human-readable alpha-numeric characteristics.

5. The system of claim 1, further comprising one or more partners to request access to the resources.

6. The system of claim 5, at least one of the partners includes a credential store to manage the credentials.

7. The system of claim 6, the at least one partner distributes the credentials to at least one other partner in order to facilitate access to the resources of the service.

8. The system of claim 1, the pass-phase is at least one of spoken, displayed on a screen and typed.

9. The system of claim 1, further comprising at least one of a Secure Socket Layer (SSL), a Virtual Private Network (VPN), and a dedicated line to establish connections to the service.

10. The system of claim 9, further comprising a remote login utilizing a basic authentication over the SSL.

11. The system of claim 9, further comprising at least one SSL certificate to establish connections to the service.

12. The system of claim 1, the partner including at least one of a tenant and a service provider to form at least one of a billing, a financial, and an accounting service.

13. The system of claim 12, the partner employs the pass-phrase to unlock the credentials and achieve access to the platform provisioning services.

14. A method to facilitate a security connection between remote entities, comprising:
    generating a strong password via a random generation function associated with a standard platform;
    generating a human-readable pass-phrase; deriving a wrapping key from the pass-phrase;
    wrapping the password cryptographically via the pass-phrase, wherein the wrapping key facilitates in encapsulating the password in a wrapper;
    storing the wrapped password in an executable;
    transmitting the executable and the pass-phrase to a remote user system separately via different communications mediums, wherein the remote user employs the pass-phrase to unlock the strong password stored in the executable, the strong password employed to establish a trust relationship with an entity; and
    requesting a Secure Sockets Layer (SSL) connection, presenting an SSL certificate in response to the request, verifying an SSL certificate, requesting a Universal Resource Locator (URL) from a listener, presenting authentication credentials to a receiver, or logging in a caller to an account.

15. The method of claim 14, further comprising limiting access to the executable.

16. The method of claim 14, further comprising at least one of:
    setting up account privileges;
    designating account contacts; and
    verifying the contacts.

17. The method of claim 16, further comprising verbally communicating the pass-phrase.

18. The method of claim 17, further comprising transmitting and storing the password and the pass-phrase separately.

19. A computer implemented system that facilitates a security relationship between parties, comprising:
    a computer processor for executing the following means stored in computer memory:
    means for generating credentials comprising at least a password;
    means for generating a pass-phrase;
    means for generating a package of credentials by wrapping the credentials with a cryptographic wrapping key derived from the pass-phrase, wherein the credentials are encapsulated by the wrapper, the credentials are associated with resources of a platform provisioning service associated with at least one partner, the platform provisioning service and the partner maintain an account to process the credentials, the at least one of the platform provisioning service and the partner employ a Universal Resource Locator (URL) to present the credentials to the account;
    means for transmitting the package and the pass-phrase to a system via different communications mediums; and
    means for storing the credentials separate from the pass-phrase.

* * * * *